United States Patent
McGee et al.

(10) Patent No.: US 10,892,112 B2
(45) Date of Patent: Jan. 12, 2021

(54) METHOD OF MAKING AN ENERGY STORAGE ARTICLE

(71) Applicant: United Technologies Corporation, Farmington, CT (US)

(72) Inventors: Randolph Carlton McGee, Hamden, CT (US); Ying She, East Hartford, CT (US); Zissis A. Dardas, Worcester, MA (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 16/312,696

(22) PCT Filed: Jun. 24, 2016

(86) PCT No.: PCT/US2016/039372
§ 371 (c)(1),
(2) Date: Dec. 21, 2018

(87) PCT Pub. No.: WO2017/222563
PCT Pub. Date: Dec. 28, 2017

(65) Prior Publication Data
US 2019/0333715 A1    Oct. 31, 2019

(51) Int. Cl.
*H01G 11/86* (2013.01)
*H01G 11/30* (2013.01)
(Continued)

(52) U.S. Cl.
CPC ............. *H01G 11/86* (2013.01); *H01G 11/26* (2013.01); *H01G 11/30* (2013.01); *H01G 11/46* (2013.01); *H01G 11/58* (2013.01); *C23C 8/24* (2013.01)

(58) Field of Classification Search
CPC ........ H01G 11/86; H01G 11/26; H01G 11/30; H01G 11/46; H01G 11/58; H01G 11/24; C23C 8/24; Y02E 60/13
(Continued)

(56) References Cited

U.S. PATENT DOCUMENTS

| 3,416,891 A | 12/1968 | Roubin et al. |
| 3,591,338 A | 7/1971 | Roberts |

(Continued)

FOREIGN PATENT DOCUMENTS

| CA | 2207387 A1 | 6/1996 |
| CN | 1562769 A | 1/2005 |
| CN | 102064024 A | 5/2011 |

OTHER PUBLICATIONS

International Search Report for International Application No. PCT/US2016/039372, dated Mar. 28, 2017, 6 pages.
(Continued)

*Primary Examiner* — Caleen O Sullivan
(74) *Attorney, Agent, or Firm* — Cantor Colburn LLP

(57) ABSTRACT

A method of making an energy storage article having a metal nitride electrode is disclosed where metal nitride is made by nitriding particles of a metal or oxide of a metal selected from vanadium molybdenum, titanium, niobium, tungsten, or combinations including any of the foregoing by contacting the particles with a gas of nitrogen and hydrogen, or ammonia, in a fluidized bed reactor to form particles of metal nitride for the electrode.

20 Claims, 2 Drawing Sheets

(51) Int. Cl.
*H01G 11/46* (2013.01)
*H01G 11/58* (2013.01)
*H01G 11/26* (2013.01)
*C23C 8/24* (2006.01)

(58) Field of Classification Search
USPC .......................................................... 29/25.03
See application file for complete search history.

(56) References Cited

U.S. PATENT DOCUMENTS

2012/0262842 A1   10/2012  Thompson et al.
2014/0104751 A1*  4/2014  Chen ...................... H01G 11/02
                                                        361/502

OTHER PUBLICATIONS

Written Opinion of the International Searching Authority for International Application No. PCT/US2016/039372, dated Mar. 28, 2017, 7 pages.

\* cited by examiner

METHOD OF MAKING AN ENERGY STORAGE ARTICLE

BACKGROUND

This disclosure relates to energy storage, and in particular to electrode materials for energy storage articles such as supercapacitors.

Various types of energy storage devices such as capacitors are known for applications involving storage and recovery or discharge of electrical energy. Conventional capacitors utilize two electrodes separated by a dielectric material. Electrical power is supplied to a circuit connecting the electrodes to charge the electrodes, and electrical energy is stored in an electrical field through the space occupied by the dielectric. When the power supply to the electrodes is removed, electrical energy is recovered from electric field back to the circuit. Various materials are known to be used as dielectric materials for capacitors, having various capacitance levels. Electrolytic capacitors place an electrode in contact with an electrolyte and reversibly store energy through electrostatic-induced alignment of ions in the electrolyte in the region of the electrode. Supercapacitors also utilize an electrolyte and provide the energy storage features of electrolytic capacitors, plus pseudocapacitive storage of energy through electronic interactions at the interface of the electrolyte with special types of electrodes. These interactions can include reversible redox reactions involving electrode material(s) and desolvated electrolyte ions, intercalation, electrosorption, or combinations thereof.

Supercapacitors can provide higher energy storage capacity compared to other capacitors, albeit with lower voltage limits. However, the performance of a supercapacitor can be highly dependent on the composition and morphology of the electrode material. Many types of materials have been proposed for supercapacitor electrodes, but new materials and techniques continue to be sought out.

BRIEF DESCRIPTION

According to some embodiments of the disclosure, a method of making an energy storage device comprises nitriding particles comprising a metal or oxide of a metal selected from vanadium, molybdenum, titanium, niobium, tungsten, or combinations comprising any of the foregoing by contacting the particles with a gas mixture comprising nitrogen and hydrogen, or ammonia, in a fluidized bed reactor to form particles comprising metal nitride, and forming a first electrode comprising the metal nitride. The first electrode is disposed in an energy storage device comprising a liquid electrolyte comprising ions in contact with the first electrode. An ion-permeable membrane separates the electrolyte into a first section comprising the first electrode and a second section comprising a second electrode in contact with the electrolyte.

In any one or combination of the foregoing embodiments, nitriding the particles in the fluidized bed reactor converts at least 95 wt. % of the metal in the particles to metal nitride.

In any one or combination of the foregoing embodiments, nitriding the particles in the fluidized bed reactor converts at least 95 wt. % of the metal in the particles to metal nitride.

In any one or combination of the foregoing embodiments, nitriding the particles in the fluidized bed reactor converts all of the metal in the particles to metal nitride.

In any one or combination of the foregoing embodiments, the second electrode comprises metal nitride formed by nitriding particles comprising a metal or oxide of a metal selected from vanadium molybdenum, titanium, niobium, tungsten, or combinations comprising any of the foregoing by contacting the particles with a gas mixture comprising nitrogen and hydrogen, or ammonia, in a fluidized bed reactor to form particles comprising metal nitride.

In any one or combination of the foregoing embodiments, the method further comprises disposing the superconductor in an electrical circuit connecting the electrodes to a power source.

In some embodiments, a method of using a energy storage device made by the method of any one or combination of the foregoing embodiments comprises connecting the first and second electrodes to an electrical circuit comprising a power source, providing electrical power from the power source to charge the electrodes to opposite polarity and create an electric double layer at the interface of the electrolyte and the electrode(s) comprising metal nitride, and pseudocapacitively transferring electrical energy between the electrical circuit and the energy storage device via redox reactions at the electrode surface of metal nitride and desolvated electrolyte ions.

In some embodiments, a method of making metal nitride comprises nitriding particles comprising a metal or oxide of a metal selected from vanadium molybdenum, titanium, niobium, tungsten, or combinations comprising any of the foregoing by contacting the particles with a gas mixture comprising nitrogen and hydrogen, or ammonia, in a fluidized bed reactor to form particles comprising metal nitride to convert at least 95 wt. % of the metal in the particles to metal nitride.

In any one or combination of the foregoing embodiments, the particles comprising metal nitride have a specific surface area of at least 50-100 $m^2/g$.

In any one or combination of the foregoing embodiments, the particles comprising metal nitride have a specific surface area of at least 65 $m^2/g$.

In any one or combination of the foregoing embodiments, the particles comprising metal nitride have a specific surface area of at least 75 $m^2/g$].

In any one or combination of the foregoing embodiments, the particles comprising metal nitride have a specific surface area of up to 85 $m^2/g$.

In any one or combination of the foregoing embodiments, the particles comprising metal nitride have a specific surface area of up to 100 $m^2/g$ In any one or combination of the foregoing embodiments, the particles comprise a mesoporous structure having a mean pore size from 2 to 50 nm.

In any one or combination of the foregoing embodiments, the particles comprise a mesoporous structure having a mean pore size from 2 to 15 nm.

In any one or combination of the foregoing embodiments, the particles comprising metal that are subjected to nitriding in the fluidized bed comprise an oxide of a metal or oxide of a metal selected from vanadium molybdenum, titanium, niobium, tungsten, or combinations comprising any of the foregoing.

In any one or combination of the foregoing embodiments, the metal comprises vanadium.

In any one or combination of the foregoing embodiments, the oxide of the metal is selected from $NH_4VO_3$ or $V_2O_5$.

In any one or combination of the foregoing embodiments, the gas mixture comprises nitrogen and hydrogen.

In any one or combination of the foregoing embodiments, the gas mixture comprises ammonia.

In some embodiments where the gas mixture comprises nitrogen and hydrogen, the gas mixture is free from ammonia or has an amount of ammonia less than any of various concentration levels specified herein.

BRIEF DESCRIPTION OF THE DRAWINGS

Subject matter of this disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
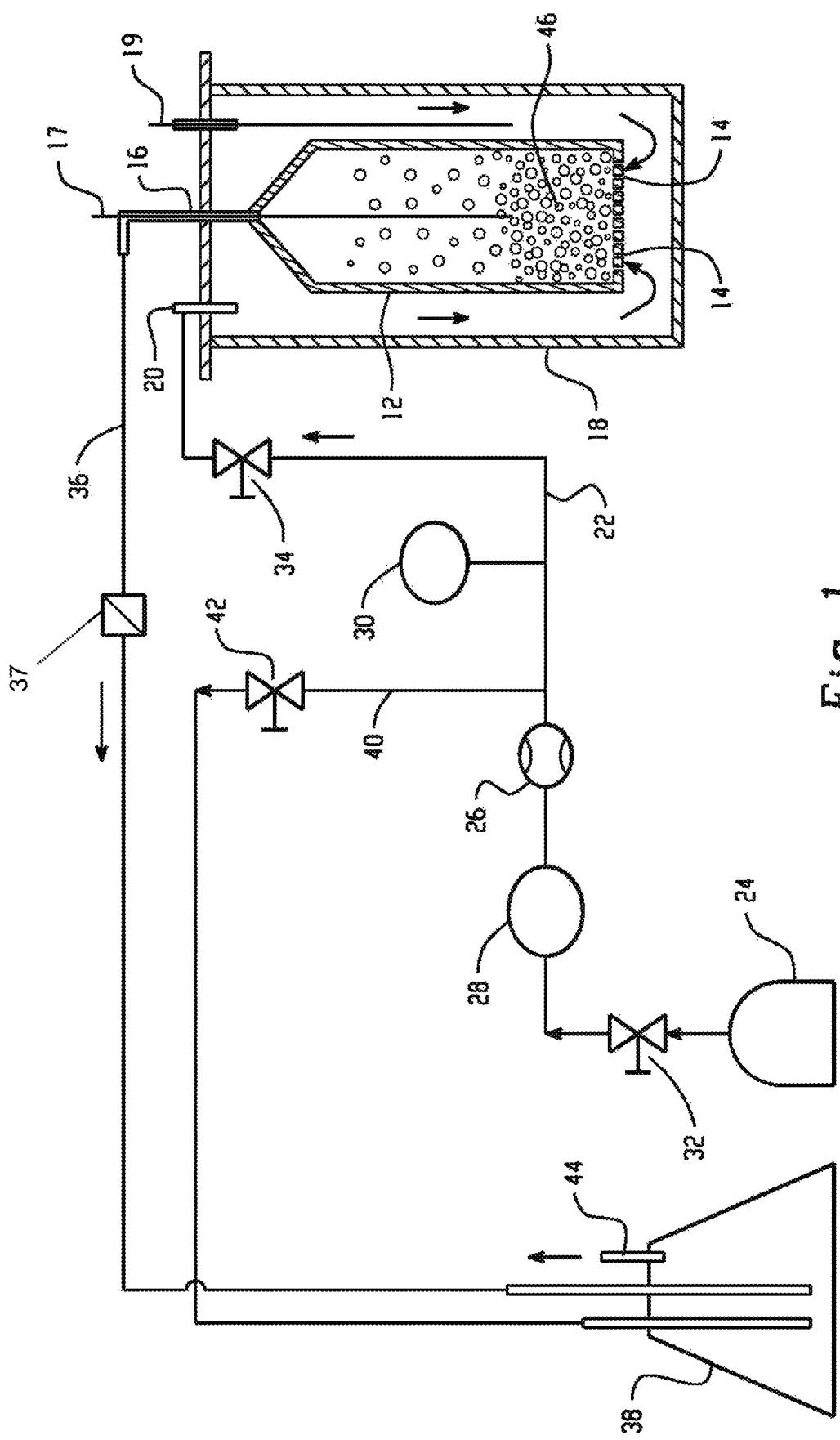
FIG. 1 is a schematic depiction of an example embodiment of a fluidized bed reactor assembly.

An exemplary fluidized bed reactor assembly for nitriding particles comprising a metal or oxide of a metal selected from vanadium, molybdenum, titanium, niobium, tungsten, or combinations comprising any of the foregoing is depicted in FIG. 1. As shown in FIG. 1, the assembly includes a fluidized bed reactor 12 having inlet openings 14 disposed at one end of the reactor 12 and an outlet opening 16 disposed at the opposite end of the reactor 12. The fluidized bed reactor 12 is disposed inside of an outer tubing 18, with outlet 16 extending to the outside of outer tubing 18. During operation, the fluidized bed assembly is disposed in a furnace (not shown) to provide heat. Thermocouples 17 and 19 are disposed to monitor temperature in the reactor 12 and outer tubing 18, respectively. An inlet 20 is connected to a gas feed line 22. A gas source 24 such as a storage tank or a gas-generating reactor is connected to gas feed line 22 to supply a gas feed to the fluidized bed reactor 12. Other components, such as mass flow controller 26, pressure regulating valve 28, pressure sensor 30, and shut-off valves 32 and 34 are also disposed in the gas feed line 22 for monitoring and controlling the flow rate and pressure of the gas delivered to the reactor 12. Reactor outlet 16 is connected to outlet line 36 that includes a check valve 37, and is connected to a water or other liquid bubbler 38. A bleed line 40 with shut-off valve 42 also connects feed line 22 to the bubbler 38, which is vented to atmosphere through exhaust port 44.

In operation, a gas mixture comprising nitrogen and hydrogen, or ammonia, from gas source(s) 24 is fed through feed line 22, with the flow rate and gas pressure controlled by mass flow controller 26 and pressure regulating valve 28. In some embodiments, the gas comprises an amount of hydrogen in a range having a low end of 30 mol %, more specifically 40 mol %, and even more specifically 60 mol %, and an upper end of 90 mol %, more specifically 80 mol %, and even more specifically 85 mol %, based on the total mole percentage of nitrogen and hydrogen, or ammonia, in the gas. Other gases (e.g., noble gases) can be included as well, and the gas can in some embodiments comprise an amount of nitrogen in a range having a low end of 15 mol %, more specifically 20 mol %, and even more specifically 10 mol %, and an upper end of 70 mol %, more specifically 60 mol %, and even more specifically 40 mol %, based on the total moles of gas. The above upper and lower range endpoints can be independently combined to disclose a variety of different ranges. The nitrogen- and hydrogen-containing gas enters the furnace 18 through inlet 20. The gas is heated as it passes through the space between fluidized bed 12 and outer tubing 18 to enter the fluidized bed reactor 12 through outlet 14. The fluidized bed reactor 12 has metal particles 46 disposed therein, and the upward gas flow rate through the reactor applies sufficient upward force to the particles 46 to counteract the force of gravity acting on the particles so that they are suspended in a fluid configuration in the reactor space. The gas flow is generally maintained below levels that would carry entrained particles out of the reactor 16 through outlet 16, and outlet 16 can also be fitted with a filter or screen to further assist in keeping metal powder particles 46 from exiting the reactor 12. Nitrogen-containing gas exits the reactor 12 through outlet 16 and flows via outlet line 36 to the bubbler 38, from which it is exhausted to the atmosphere through exhaust port 44.

In some embodiments, nitriding of the metal particles continued for a duration and/or under conditions to provide a target conversion of metal to metal nitride (in some embodiments, by "conversion" it is meant that metal atoms are integrated into a metal nitride lattice structure). Although the disclosure is not bound by any particular theory or mode of operation, it is believed that a target conversion of metal to metal nitride can provide a mass of reduced metal in a reduced state that can be reversibly oxidized to various metal oxides during pseudocapacitive energy transfer. In some embodiments, nitriding the particles in the fluidized bed reactor converts at least 95 wt. % of the metal in the particles to metal nitride. In some embodiments, nitriding the particles in the fluidized bed reactor converts at least 95 wt. % of the metal in the particles to metal nitride. In some embodiments, nitriding the particles in the fluidized bed reactor converts all of the metal in the particles to metal nitride. In some embodiments, the reaction temperature in the reactor can range from 500° C. to 800° C., more specifically from 650° C. to 750° C., and even more specifically from 660° C. to 700° C. The metal powder particles can be nitrided for periods (i.e., contact time with the nitrogen-containing gas) ranging from 1 hour to 5 hours, more specifically from 1 hour to 10 hours, and even more specifically from 1 hour to 30 hours. In batch mode, such as depicted in the reaction scheme shown in FIG. 1, the reactor is operated for the specified amount of time to achieve the desired contact time. In a continuous mode, throughput of the particles through the reactor can be adjusted to achieve an average residence time equal to the desired contact time.

In some embodiments, the metal particles comprise elemental metal or oxide of a metal selected from vanadium, molybdenum, titanium, niobium, tungsten, or combinations comprising any of the foregoing vanadium metal or compounds comprising vanadium such as an oxide of vanadium. In some embodiments, the particles can comprise an oxide of the metal. Examples of metal oxides include $NH_4VO_3$ or $V_2O_5$. The particle size can vary depending on factors such as the desired final particle size, fluidized bed reactor parameters such as velocity of gas flow in the reactor, etc. In some embodiments, the metal particles that are processed in the fluidized bed reactor can have particle sizes in a range having a low end of 5 nm, more specifically 8 nm, and even more specifically 10 nm, and an upper end of 12 nm, more specifically 15 nm, and even more specifically 50 nm. The above upper and lower range endpoints can be independently combined to disclose a variety of different ranges.

In some embodiments, the fluidized bed reactor can provide various technical benefits (e.g., compared to the fixed bed reactors that are conventionally used with ammonia to make metal nitrides such as vanadium nitride), including but not limited to providing uniform reaction conditions for the population of vanadium-containing particles, avoiding localized hot spots that can occur in fixed bed reactors.

The gas mixture can comprise hydrogen and nitrogen, or ammonia, or a mixture of hydrogen, nitrogen, and ammonia. The use of a gas mixture comprising nitrogen and hydrogen can in some embodiments help to avoid heat transfer problems associated with the endothermic decomposition of ammonia, and also allow for recycling of essentially all of the gas fed to the reactor. In some embodiments, the gas fed to the reactor is free of ammonia. In some embodiments, the gas mixture comprises nitrogen and hydrogen, and also comprises ammonia in an amount less than or equal to 5 mol %. In some embodiments, the gas mixture comprises nitrogen and hydrogen, and also comprises ammonia in an amount less than or equal to 10 mol %. In some embodiments, the gas mixture comprises nitrogen and hydrogen, and also comprises ammonia in an amount of from 5 mol % to less than 100 mol % ammonia. In some embodiments, the gas mixture comprises ammonia without a nitrogen/hydrogen mixture.

Fluidized bed processing in nitrogen/hydrogen and/or ammonia can in some embodiments promote beneficial surface morphologies (e.g., surface area, porosity, etc.) in the resulting product of vanadium nitride particles. In some embodiments, the particles comprising vanadium nitride that result from nitriding in the fluidized bed reactor can have a specific surface area in a range having a low end of 60 g/m$^2$, more specifically 65 g/m$^2$, and even more specifically 75 g/m$^2$, and an upper end of 85 g/m$^2$, more specifically 90 g/m$^2$, and even more specifically 100 g/m$^2$. The above upper and lower range endpoints can be independently combined to disclose a variety of different ranges.

After emergence from the fluidized bed reactor, the metal particles can in some embodiments be subjected to further processing before formation of the electrode. For example, in some embodiments, the metal nitride powder can be separated into different particle size ranges that can be targeted toward different applications.

The electrode can be formed in various ways. For example, supercapacitors are typically constructed with two metal foils to serve as current collectors whereby each is coated with the electrode material (e.g., vanadium nitride), which will act as a power connection between the electrode the external capacitor terminals. In some embodiments, a large surface area (as discussed below) for the electrode material is utilized. The electrodes are kept apart by an ion-permeable membrane which also provides insulation to protect the electrodes. This combination is then configured into either a rectangular or cylindrical shape and subsequently stacked in the proper housing. Then the cell is impregnated with a liquid or viscous electrolyte of organic or aqueous type. The electrolyte is an ionic conductor, fills the pore space of the electrodes, and serves as the conductor between the electrodes. To complete the assembly, the housing is hermetically sealed.

Figure 2:
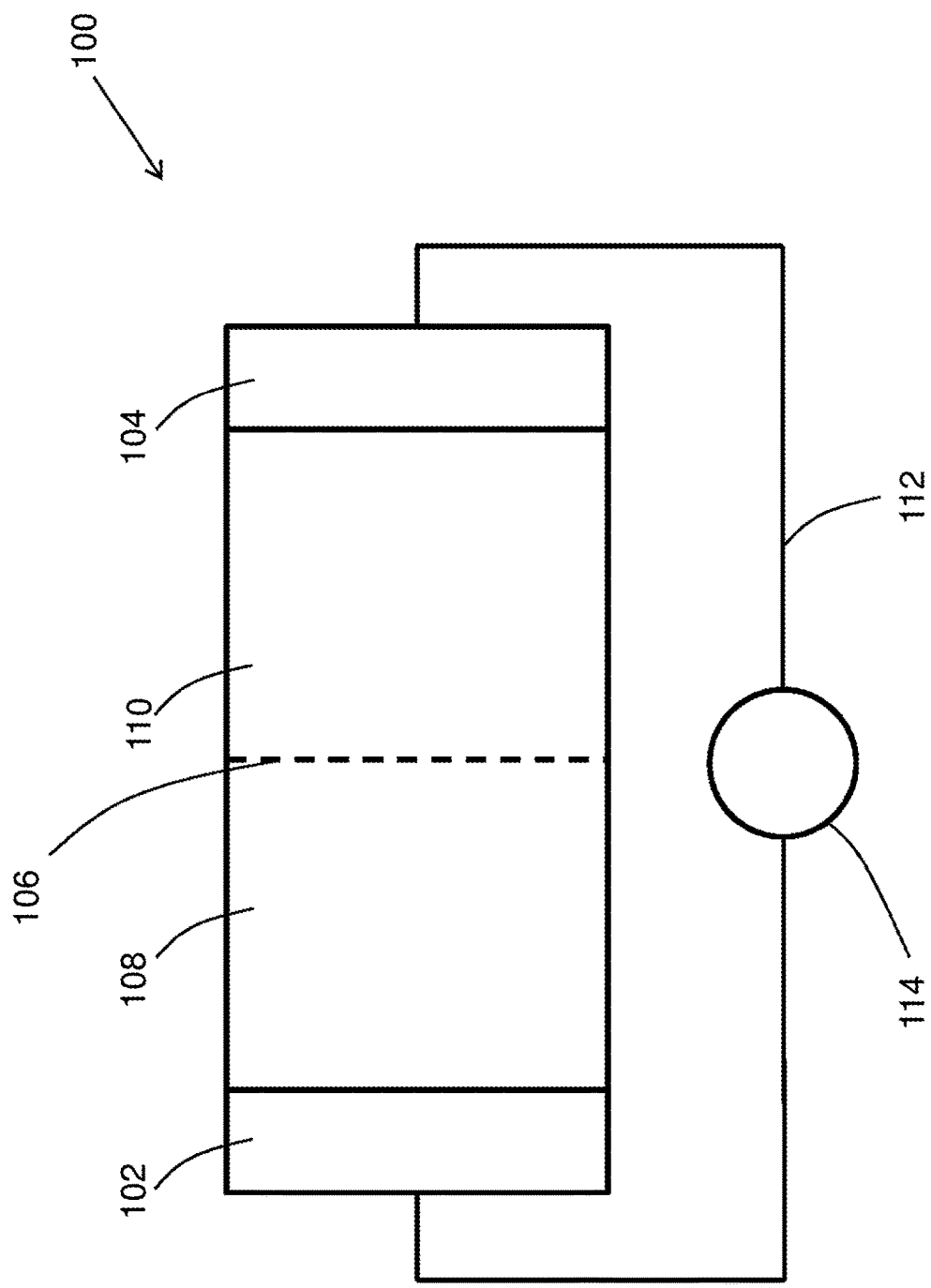
FIG. 2 is a schematic depiction of an example embodiment of an energy storage device.

Turning now to FIG. 2, a typical energy storage device such as a supercapacitor that can utilize an electrode material as described herein is schematically depicted. As shown in FIG. 2, device 100 comprises a first electrode 102 and a second electrode 104 separated by a liquid electrolyte. The electrolyte comprises can be aqueous or non-aqueous, and comprises solvated ions. Examples of ions that can be found in the electrolyte include but are not limited to Na$^+$, H$^+$, and NO$_3^-$. Examples of non-aqueous solvents include but are not limited to tetraethylammonium tetrafluoroborate (TEATFB) salt dissolved in one or more solvent(s) that can include acetonitrile and/or propylene carbonate. Other solvents can include tetraalkyl-ammonium salts in acetonitrile (AN) or in propylene carbonate (PC), and co-solvents as well, including ethyl acetate, methyl formate, methyl acetate, trimethylamine. In ionic liquids such as those based on imidazolium and several salts with the 1-ethyl-3-methyl-imidazolium cation (EMI) can be used. The electrolyte is separated by an ion-permeable membrane 106 into a first section 108 associated with the first electrode 102, and a second section 110 associated with the second electrode 104. In some embodiments, one of the electrodes comprises vanadium nitride produced as described above. In some embodiments, both of the electrodes comprise vanadium nitride produced as described above. The electrodes 102 and 104 are connected by an electrical circuit 112 that includes a power source 114 for charging the electrodes. Other circuitry (not shown) can controllably direct electrical energy discharged from the device 100 to a power sink (not shown). During operation, the power source 114 provides electrical power to charge the electrodes to opposite polarity. Typically, a double electric layer is formed at the interface of the comprising a polarized layer at the electrode surface and layer of electrostatically aligned solvated ions in the electrolyte at the interface, with the two layers separated by a monoatomic-thick layer of solvent molecules acting as a dielectric separating the two electric layers. The double electric layer provides electrolytic-type capacitance. Pseudocapacitance can be provided by various mechanisms, including but not limited to intercalation, electrosorption, reversible redox reactions involving electrode material(s) and desolvated electrolyte ions that adsorb (but do not react to form chemical bonds with) electrode material at the electrode surface, or combinations thereof. In the particular case of vanadium nitride electrodes, the redox reactions involve reversible oxidation of the vanadium nitride to form any one or combination of various vanadium oxides, including but not limited to VO$_2$, V$_2$O$_3$, V$_3$O$_5$, V$_4$O$_7$. Electrons involved in the redox reactions can be stored with the adsorbed ionic species or can be released to flow through the electrical circuit 112, thereby providing pseudocapacitance.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A method of making an energy storage device, comprising
    nitriding particles comprising a metal, NH$_4$VO$_3$, an oxide of a metal selected from molybdenum, titanium, niobium, or tungsten, or combinations comprising any of the foregoing by contacting the particles with a gas mixture comprising nitrogen and hydrogen in a fluidized bed reactor to form particles comprising metal nitride;
    forming a first electrode comprising the metal nitride; and
    disposing the first electrode in a energy storage device comprising a liquid electrolyte comprising ions in contact with the first electrode, an ion-permeable membrane separating the electrolyte into a first section comprising the first electrode, and a second section comprising a second electrode in contact with the electrolyte.

2. The method of claim 1, wherein nitriding the particles in the fluidized bed reactor converts at least 95 wt. % of the metal in the particles to metal nitride.

3. The method of claim 1, wherein nitriding the particles in the fluidized bed reactor converts at least 95 wt. % of the metal in the particles to metal nitride.

4. The method of claim 1, wherein nitriding the particles in the fluidized bed reactor converts all of the metal in the particles to metal nitride.

5. The method of claim 1, wherein the second electrode comprises metal nitride formed by contacting particles comprising a metal, $NH_4VO_3$, an oxide of a metal selected from molybdenum, titanium, niobium, or tungsten, or combinations comprising any of the foregoing with a gas mixture comprising nitrogen gas and hydrogen gas in a fluidized bed reactor.

6. The method of claim 1, further comprising disposing the superconductor in an electrical circuit connecting the electrodes to a power source.

7. The method of claim 1, wherein the particles comprising metal nitride have a specific surface area of at least 50-100 $m^2/g$.

8. The method of claim 7, wherein the particles comprising metal nitride have a specific surface area of at least 65 $m^2/g$.

9. The method of claim 8, wherein the particles comprising metal nitride have a specific surface area of at least 75 $m^2/g$.

10. The method of claim 1, wherein the particles comprising metal nitride have a specific surface area of up to 100 $m^2/g$.

11. The method of claim 10, wherein the particles comprising metal nitride have a specific surface area of up to 85 $m^2/g$.

12. The method of claim 1, wherein particles comprising metal nitride comprise a mesoporous structure having a mean pore size from 2 to 50 nm.

13. The method of claim 12, wherein particles comprising metal nitride comprise a mesoporous structure having a mean pore size from 2 to 15 nm.

14. The method of claim 1, wherein the particles comprise vanadium or $NH_4VO_3$.

15. The method of claim 14, wherein the particles comprise an oxide of vanadium selected from $NH_4VO_3$ or $V_2O_5$.

16. The method of claim 1, wherein the gas mixture comprises nitrogen and hydrogen.

17. The method of claim 16, wherein the gas mixture is free of ammonia.

18. The method of claim 1, wherein the gas mixture comprises ammonia.

19. A method of using an energy storage device made by the method of claim 1, comprising connecting the first and second electrodes to an electrical circuit comprising a power source, providing electrical power from the power source to charge the electrodes to opposite polarity, and pseudocapacitively transferring electrical energy between the electrical circuit and the energy storage device via redox reactions at the electrode surface of metal nitride and desolvated electrolyte ions.

20. A method of making metal nitride, comprising nitriding particles comprising a metal, $NH_4VO_3$, or oxide of a metal selected from molybdenum, titanium, niobium, or tungsten, or combinations comprising any of the foregoing by contacting the particles with a gas mixture comprising nitrogen and hydrogen in a fluidized bed reactor to form particles comprising metal nitride to convert at least 95 wt. % of the metal in the particles to metal nitride.

* * * * *